April 18, 1961   R. HAINY   2,980,358
FILM SPOOL COUPLING FOR PHOTOGRAPHIC CAMERAS
Filed July 15, 1957

INVENTOR.
Rudolf Hainy

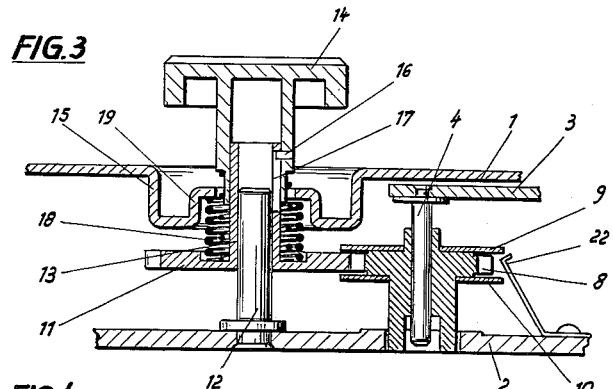
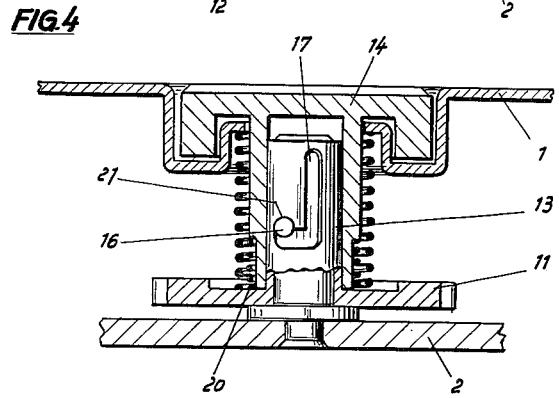
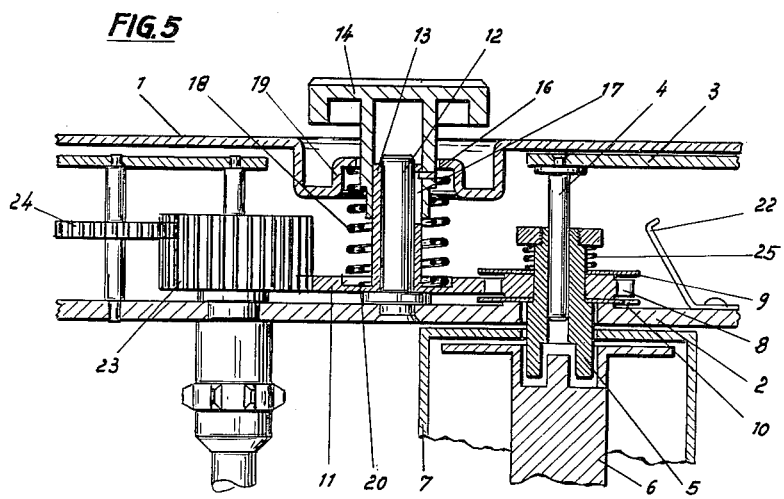

form Patent Office  
2,980,358  
Patented Apr. 18, 1961

---

2,980,358

FILM SPOOL COUPLING FOR PHOTOGRAPHIC CAMERAS

Rudolf Hainy, Dresden, Germany, assignor to VEB Kamera- und Kinowerke Dresden

Filed July 15, 1957, Ser. No. 671,832

Claims priority, application Germany July 28, 1956

12 Claims. (Cl. 242—71.3)

This invention relates to a film spool coupling for photographic cameras.

In known couplings of this type a film spool is coupled with the camera drive by means of an axially displaceable carrier drive coaxially arranged opposite the film spool, guided through the camera body and having a winding knob secured to its projecting shaft. By axial movement of the winding knob the carrier drive can be brought into and out of engagement with the film spool and the latter moved also in the direction of rotation.

This arrangement, however, is objectionable in that the winding knobs of the two carrier drives for the film spools project from the camera body and thus hinder the operation of other setting means of the camera and may also interfere with proper motion of the driving gear. This drawback is particularly troublesome in cameras wherein the film feed and the winding of the shutter are effected automatically, for instance by a spring motor or electrically.

It is an object of the invention to provide a film spool coupling in which the winding knob of the carrier drive, when in engagement with the film spool, is countersunk in the camera body and held in this position by a releasable coupling. After the winding knob has been released without being uncoupled from the film spool, it is moved by a spring out of its countersunk position and into an intermediate position so as to sufficiently project the knob from the camera body. This position permits convenient winding and rewinding of the film. The carrier drive and the film spool are disengaged by moving the winding knob still further outward against the action of a spring beyond its intermediate position and after its complete disengagement from the film, holding it in this end position by preferably non-positive locking means. The film spool and also a darkslide, if any, can thus be removed from the camera and exchanged.

The manifold functions of the film spool coupling according to the invention are made possible by disposing the winding knob at a distance from the carrier drive and keeping both in engagement with each other, for instance by toothed wheels, so that in the countersunk position of the winding knob a low over-all height of the camera is possible. The winding knob is preferably arrested in its countersunk position as well as in its intermediate and end positions by means of an intermediate gear which moves axially and is equipped with a bayonet lock engaged by a coupling member of the winding knob. This arrangement insures reliable coupling of the winding knob in its countersunk position and also permits rotary motion of the carrier gearing in the intermediate position of the knob and in its end position permits complete detachment of the carrier drive from the film spool. The arrangement, furthermore, makes possible the use of the film spool coupling for winding and rewinding a film and may also be of such construction that a film spool coupling preferably connected with the camera drive causes winding of the film and a second film spool coupling serves for rewinding it. The latter arrangement is advantageous in that in the event that there is no film spool in the camera or the film has been completely wound the second film spool coupling will not move and thus indicate the condition.

The invention is illustrated by way of example in the accompanying drawings, wherein:

Figures 1 to 3 are sectional views of different operating positions of the film spool coupling;

Fig. 4 is a sectional view showing details of a preferred manner of coupling the winding knob with the gearing; and Fig. 5 shows the film spool coupling in connection with a camera drive.

Figure 1:
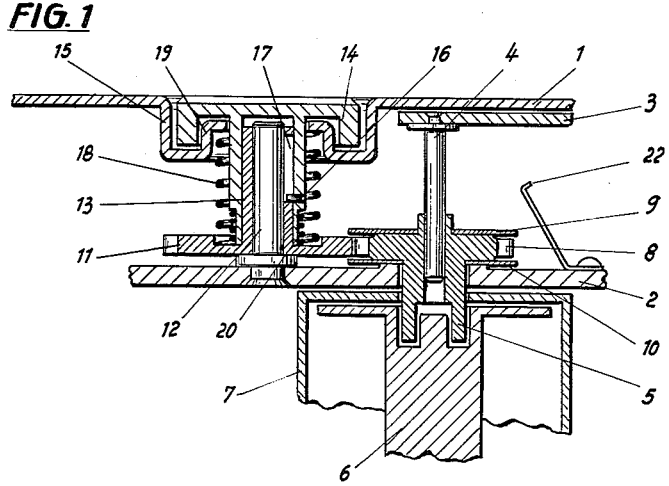

The drawings show only those parts that are required for understanding the invention.

Between the upper wall 1 and the intermediate wall 2, a guide pin 4 serving for axial displacement and also as bearing of the carrier drive 5 is secured to a bearing part 3. The guide pin 4 is coaxially arranged opposite the film spool 6 and its darkslide 7 so that the carrier drive 5 displaceable in axial direction can be brought into and out of engagement with the film spool 6. The carrier drive 5 possesses a toothed wheel 8 to the front sides of which two discs 9 and 10 are secured. The toothed wheel 8 is engaged by the spur gear driver 11 held by the pin 12 secured to the intermediate wall 2. The gear member 11 turns with its bearing bush 13 about the pin 12, the bush 13 serves also as a guide for the winding knob 14 which is so formed that in the position shown in Fig. 1, it can lie flush in the depression 15 of the upper wall 1. The winding knob 14 is provided with a coupling pin 16 which engages the bayonet lock 17 of the bearing bush 13, as indicated in Fig. 4. By means of a spiral spring 18 guided by a correspondingly treated edge 19 of wall 1 the driver 11 is always pressed down and braked, whereby sufficient friction for the film spool drive is obtained. The member 11 also takes up a spring 20 which in unlocked position presses the winding knob upwards or outwards.

Figure 2:
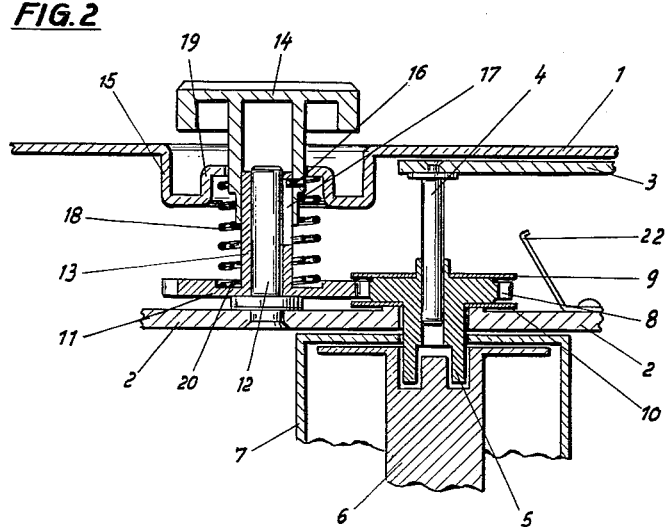

In the position shown in Fig. 1 the carrier drive 5 is coupled with the film spool 6 and the winding knob 14 countersunk in the camera body. When in this position the winding knob 14 is arrested by the engagement of its coupling pin 16 with the transverse slot of the bayonet lock 17, as shown in Fig. 4, the slot being preferably provided at its end with a notch 21. Owing to this arrangement, the winding knob 14 subjected to the action of the spring 20 will remain in its countersunk position. To release it, the winding knob 14 is first pressed downwardly and then turned out of the transverse slot of the bayonet lock 17 until the longitudinal groove thereof is reached, whereupon the winding knob 14 is pressed out of its flush position by means of the spring 20 as shown in Figs. 2 and 5. In this position the winding knob is stopped by its coupling pin 16 at the end of the bayonet guide, but the carrier drive 5 is still coupled with the film spool 6 so that by turning the winding knob 14 projecting from the camera body the film can be conveniently wound or rewound.

Disengagement of the carrier drive 5 from the film spool 6 is performed by moving the winding knob 14 in axial direction out of the intermediate position shown in Figs. 2 and 5 upwardly or outwardly until the position shown in Fig. 3 is reached. During this movement the winding knob 14 by its coupling pin 16 moves the driver 11 against the action of the spring 18 while simultaneously by engagement of the driver 11 with the gear 8, the carrier drive 5 is lifted also, the two discs 9 and 10 positively insuring axial movement of member 5. Complete uncoupling is thus attained so that in this position (Fig. 3) both the film spool 6 and the darkslide 7 can be exchanged. This end position can be preferably locked by a spring 22 placed below the disc 9 of the carrier drive 5. Unlocking and actuating the winding knob 14 can be facilitated by corrugating its upper or front side and its edge.

The film spool coupling according to the invention may be used for both the take-up spool and rewinding, as indicated in Figs. 1 to 3. It is further possible to use this film spool coupling in connection with the camera driving gear as indicated particularly in Fig. 5 where the film spool coupling with its driver 11 is in constant engagement with the film travel mechanism 23 which may receive drive over the gear wheel 24 of the camera drive. The carrier drive 5 and the toothed wheel 8 are frictionally engaged to each other by being suitably dimensioned. Additional frictional coupling is provided between the drive 5 and the toothed wheel 8 by a spring 25 which frictionally engages both of the members. This frictional coupling serves to adjust winding of the film relative to its speed. The speed at which a film spool advances film, as it is turned at a constant rate, varies with the amount of film on the spool. However, it is necessary that the film advance be regular and maintained at a predetermined rate. The friction coupling allows the spool to turn at any predetermined rate preferably faster than the rate of the film winding device without tearing the film, the friction coupling allowing the spool to slow down to a rate comparable to the film advancing means 23.

I claim:

1. In a photographic camera having a housing, a depression projecting into said housing, a film spool adapted for positioning within said housing, film advancing means in said housing, a winding knob adapted for countersunk positioning within said depression and axially shiftable into an intermediate and an end position outwardly displaced from said depression, a driver coaxially and rotatably cooperative with said winding knob for operation of said film advancing means, a carrier drive gear axially offset from said driver and in engagement with said driver for driving rotation thereby, said carrier drive gear including means adapted to be in engagement with the driver for causing axial movement thereof by said driver, a carrier drive coaxial with said carrier drive gear for coaction therewith in the rotary and axial direction so as to be turned and axially moved by said driver, and positioned to be engaged with said spool only in the countersunk and intermediate position of said winding knob, resilient means connected to said winding knob for urging said winding knob into said intermediate position, and locking means connected to said knob for selectively locking said knob in said countersunk position.

2. In a camera as in claim 1 said means for locking said knob includes a bayonet lock serving to couple said winding knob to said driver.

3. In a camera as in claim 2 said resilient means being cooperative with said bayonet lock to provide locking of said winding knob in said countersunk position.

4. In a camera as in claim 3 a second resilient means disposed between said camera housing and said driver serving to provide a force against said driver to actuate the winding knob from said end position to said intermediate position.

5. In a camera having a housing, a depression on the outer surface of said housing and projecting into said housing, a rotatable winding knob mounted on said housing for countersunk positioning within said depression and for axial movement out of said depression to an intermediate and an end position, a spur gear rotatably mounted in said camera; means including a pin and slotted member to receive said pin for keying said winding knob to said spur gear and for locking said knob in said countersunk position and for axially moving said spur gear when said pin reaches the end of the slot and said knob is moved from said intermediate to said end position, a spool control capable of rotating a spool within the housing for winding film thereon and rotatably and axially engaged with said spur gear for rotary and axial movement thereby, said film spool control including means engaging said film spool in one axial position corresponding to the intermediate position of said winding knob and disengaging the film spool in the axial position corresponding to the end position of said knob.

6. In a camera as set forth in claim 5, film transport means in engagement with said spur gear, whereby the film is advanced off said spool when said knob is turned in one direction and returned when said knob is turned in the other direction.

7. In a camera as set forth in claim 5, friction means in engagement with said housing and said spur gear for restraining the movement of said spur gear, whereby the advance of film is restrained.

8. In a camera as set forth in claim 5, first compressive resilient means positioned between said spur gear and said housing for axially urging said spur gear and film spool control in a direction away from said housing so as to engage said control with the film spool and for frictionally restraining the free rotation of said spur gear, and second resilient means in engagement with said bayonet arrangement for locking said winding knob in a countersunk position and for urging said knob into said intermediate position.

9. A photographic camera comprising a housing adapted to receive a film spool and having a depression in the outer surface, a winding knob adapted for axial movement into a countersunk position in the depression, an axially shiftable driver biased into one position in said housing and slidably keyed to said knob along the axis of said knob to permit relative outward movement of said knob to a predetermined outward position, said driver being axially movable by said knob upon movement of said knob out of said depression beyond the predetermined position, a film spool winder axially offset from said driver and engaged to said driver for rotary movement therewith and including means for axial movement by said driver from a position in engagement with the film spool to a position releasing the spool, and film advancing means rotatably mounted in said housing offset from said driver and engaged to said driver.

10. A photographic camera as in claim 9, wherein said film spool winder includes a spur gear engaging said driver, and a spool engaging member frictionally engaged to said gear so that the spool engaging member may slip relative to said gear and relative to said film advancing means.

11. A photographic camera comprising a housing adapted to receive a film spool and having a depression in the outer surface thereof; a winding mechanism including a winding knob adapted for axial movement into a countersunk position in the depression, an axially shiftable driver slidably keyed to said knob along the axis thereof and axially movable by said knob upon movement of said knob out of said depression beyond a predetermined position, and a film spool winder axially offset from said driver for rotary movement therewith and having flanges for axial movement by said driver to engage and disengage the winder from the spool; film advancing means rotatably mounted in said housing and offset from said driver and positively engaged with said driver, and biasing means urging said driver into said housing.

12. A photographic camera comprising a housing, a depression in said housing, a winding knob adapted for countersunk positioning within said depression and axially shiftable to an intermediate and an end position outwardly displaced from said depression, a film spool adapted for positioning within said housing, a driver rotatably coacting with said winding knob, a spool drive cooperable with said driver engaged to said film spool only in the countersunk and intermediate positions of said winding knob, resilient means connected to said winding knob for urging said knob into said intermediate position, and a bayonet lock connected to said knob for coupling said knob to said driver and for selectively locking said knob in said countersunk position, said winding knob being coaxial with respect to said driver.

References Cited in the file of this patent

UNITED STATES PATENTS

| | | |
|---|---|---|
| 1,631,302 | Washington | June 7, 1927 |
| 2,241,122 | Drotning | May 6, 1941 |
| 2,245,214 | Mihalyi | June 10, 1941 |
| 2,622,819 | Goldhammer | Dec. 23, 1952 |
| 2,704,969 | Mische | Mar. 29, 1955 |

FOREIGN PATENTS

| | | |
|---|---|---|
| 816,193 | Germany | Oct. 8, 1951 |